United States Patent [19]
Menke

[11] Patent Number: 5,842,768
[45] Date of Patent: Dec. 1, 1998

[54] SIGNAL LIGHT OSCILLATING MECHANISM

[75] Inventor: W. Kenneth Menke, Glendale, Mo.

[73] Assignee: The Fire Products Company, Webster Groves, Mo.

[21] Appl. No.: 653,330

[22] Filed: May 24, 1996

Related U.S. Application Data

[60] Continuation-in-part of Ser. No. 379,902, Jan. 30, 1995, Pat. No. 5,537,298, which is a division of Ser. No. 6,615, Jan. 21, 1993, Pat. No. 5,385,062.

[51] Int. Cl.[6] .................................................. F21V 21/30
[52] U.S. Cl. ........................... 362/35; 362/66; 362/286; 362/289; 362/423
[58] Field of Search ................................ 362/35, 66, 80, 362/74, 287, 418; 74/89.18

[56] References Cited

U.S. PATENT DOCUMENTS

| | | | |
|---|---|---|---|
| 1,691,011 | 11/1928 | Jackson | 362/69 |
| 2,332,383 | 10/1943 | Kost . | |
| 3,739,336 | 6/1973 | Burland | 340/50 |
| 3,882,306 | 5/1975 | Armstrong | 240/48 |
| 4,281,311 | 7/1981 | Gosswiller | 340/81 |
| 4,701,743 | 10/1987 | Pearlmann et al. | 340/84 |
| 5,057,985 | 10/1991 | Kreutzer, Jr. et al. | 362/425 |
| 5,091,828 | 2/1992 | Jincks et al. | 362/35 |
| 5,097,397 | 3/1992 | Stanuch et al. | 362/74 |
| 5,385,062 | 1/1995 | Menke | 74/54 |
| 5,426,417 | 6/1995 | Stanuch | 340/473 |
| 5,584,560 | 12/1996 | Gosswiller et al. | 362/66 |
| 5,676,447 | 10/1997 | Menke | 362/35 |

Primary Examiner—Ira S. Lazarus
Assistant Examiner—David Lee
Attorney, Agent, or Firm—Howell & Haferkamp, L.C.

[57] ABSTRACT

An oscillating signal light mechanism is comprised of at least one signal light assembly mounted on a base for rotation of the light assembly relative to the base, a source of motive power including an output shaft selectively rotated in opposite directions of rotation, and a mechanism mechanically connecting the output shaft to the signal light assembly for converting the rotation of the output shaft in opposite directions of rotation to cycling movements of the signal light assembly through two different arc segment oscillations.

20 Claims, 6 Drawing Sheets

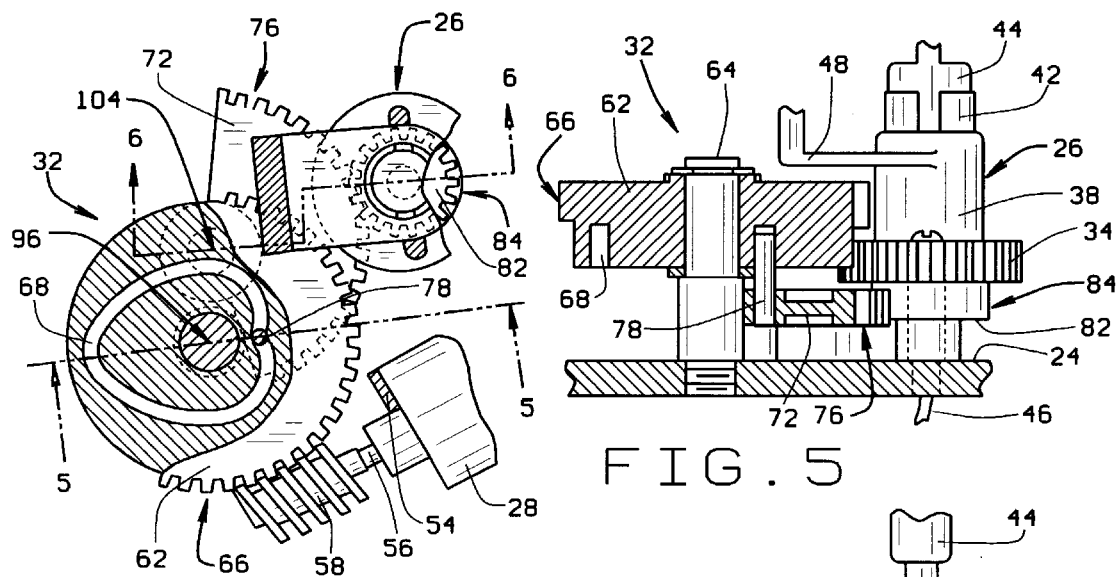
FIG. 4
FIG. 5
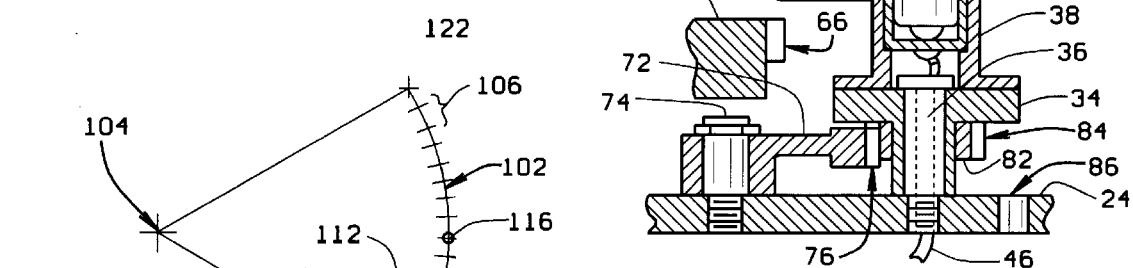
FIG. 6
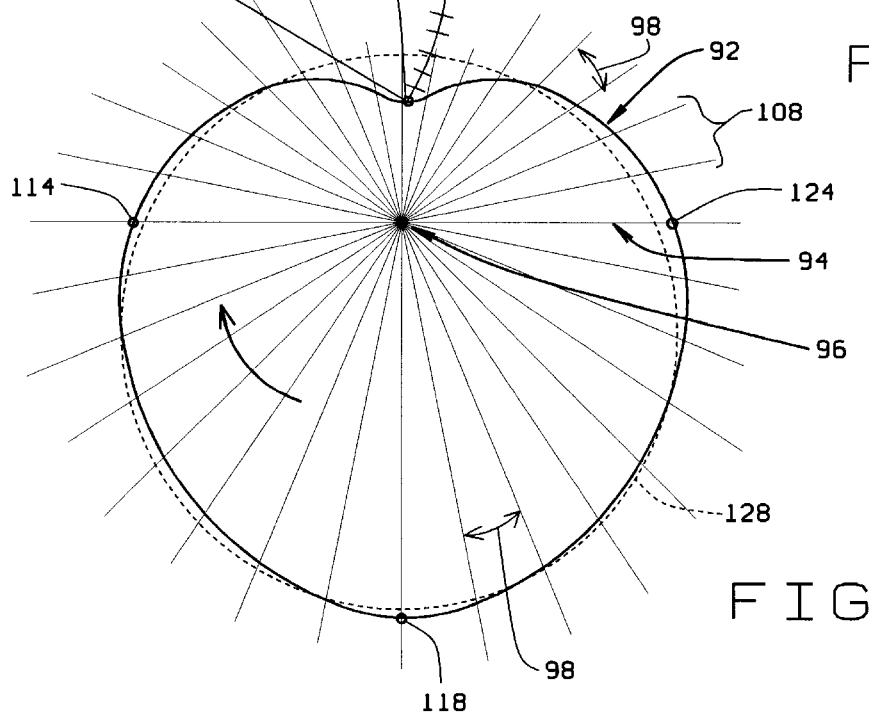
FIG. 7

SIGNAL LIGHT OSCILLATING MECHANISM

This application is a continuation-in-part of U.S. patent application Ser. No. 08/379,902, filed Jan. 30, 1995 and now issued U.S. Pat. No. 5,537,298, which is a divisional application of U.S. patent application Ser. No. 08/006,615, filed Jan. 21, 1993, and now issued U.S. Pat. No. 5,385,062.

BACKGROUND OF THE INVENTION (1) Field of the Invention

The present invention pertains to an oscillating signal light mechanism which mechanically produces cycles of substantially constant velocity arc segment oscillations of one or more signal light assemblies.

(2) Description of the Related Art

Signal light mechanisms of the type provided by the present invention are primarily employed on emergency and service vehicles such as police cars, fire department vehicles and road maintenance trucks. Similar mechanisms have also been employed in flashing light assemblies of other types of vehicles and in other applications where it is desired to attract the attention of individuals to flashing light signals from considerable distances.

It has long been recognized that attracting the attention of individuals to the presence of a light signal is more efficiently attained using a flashing light rather than a steady burning light. It is also generally known that flashing lights are generated more efficiently through mechanical motion of a reflector or lens assembly positioned adjacent a steady burning light rather than through electrical current interruption of a light filament. For many years signal light assemblies employing a reflector rotated about a light filament of the assembly, commonly referred to as a rotating beacon, have served as a practical means of providing visual warning.

A rotating beacon generates a beam signal of essentially constant flash rate and intensity through the entire 360° viewing area of rotation of the beam. However, in order for the beam signal generated by the rotating beacon to be visible in all directions around the beacon, the rotating beacon cannot be used in situations where the rotating beam signal will be obstructed. For example, when employed on vehicles the rotating beacon is typically mounted on the top most portion of the vehicle to avoid the rotating beam of the beacon from being obstructed by any portion of the vehicle. However, many emergency vehicles have a physical size or shape that prevents the rotating beam of a beacon from being seen. To overcome this problem, a multiple of rotating beacon light assemblies are typically installed on a vehicle so that, in combination, the assemblies provide the required visibility of flashing light signals from all points around the vehicle perimeter.

However, mounting a multiple of rotating beacon signal light assemblies on a vehicle requires a substantial amount of energy to operate the multiple assemblies. Moreover, that portion of the signal light of each rotating beacon assembly that is obstructed by a portion of the vehicle serves no signalling purpose and is wasted. To overcome this problem, oscillating signal light assemblies have been developed which employ mirrors or reflectors that are oscillated through arc segments that are only a fraction of the signal light perimeter instead of rotating the reflector and the reflected beam through complete 360° rotations.

For emergency or service vehicle applications, standards have been developed for signal light performance. These standards call for a minimum level of flash energy or intensity, in combination with a minimum and maximum number of flashes per minute visible to a stationary observer of the signal. The optimum situation to comply with the standards is to have a signal light that sweeps through a large arc to be visible around a large portion of the vehicle's perimeter, where the light signal swept through the arc has a high level of flash energy or flash intensity that is visible at a high frequency or flashes per minute to an observer positioned stationary along the swept arc.

One of the very common requirements for emergency and service warning lights is to provide different areas of warning light projection depending on the mission of the vehicle. For example, a police car pursuing a speeding vehicle or rushing to a crime scene through traffic would desire a warning light signal projected to the front of the vehicle where it would be visible in the rearview mirrors of the pursued speeding vehicle and of the other vehicles in traffic, notifying the speeder that he is being pursued and the drivers of the other vehicles that a police vehicle is rapidly coming up behind them. A flashing warning light projected to the rear of the pursuing police vehicle would only serve to distract drivers of vehicles which the pursuing police vehicle has already passed. The same police vehicle stopped on the side of the road would desire only a warning signal to the rear notifying oncoming traffic of the stopped police vehicle, and none to the front of the vehicle to avoid interfering with the vision of drivers in oncoming traffic in the opposite lane.

Previous solutions to this objective had required the use of sophisticated electronics, expensive segmented contact rings, brushes, switches and additional conductors capable of handling the high amperage lamp loads. Such solutions have significantly increased the overall cost of manufacturing the specialized signal light apparatus.

SUMMARY OF THE INVENTION

The present invention overcomes the initial expense and maintenance cost of the brushes, slip rings, electronics, etc. of prior art specialized signal light apparatus by providing a simplified oscillating signal light mechanism where the light beam of the signal light assembly is swept through two different arc segments projecting the light beam in different directions solely by mechanical means requiring only the reversal of the polarity of direct current applied to the motor to reverse the motor and shift between the two different arcs of warning light coverage. Substantial savings and costs are achieved through the use of smaller conductors and switches. While the lamps used in prior art warning lights typically draw 50 or more watts, the motor used by the light assembly of the invention to generate the two different arc segment signals typically requires only about one watt. The signal light mechanism of the invention may be employed as a signal light of emergency vehicles, and may also be employed in other applications requiring an attention attracting signalling device producing optimum signaling effectiveness at a minimum of expense.

The oscillating signal light mechanism of the invention is provided in five similar embodiments, each generally comprising a base, at least one signal light assembly mounted on the base for rotation of the assembly relative to the base, a source of motive power including an output shaft rotated in a single direction of rotation in the first four embodiments and rotated in opposite directions in the fifth embodiment, and a mechanical connection between the output shaft and the signal light assembly converting the rotation of the output shaft to cycling movements of the light assembly through arc segment oscillations.

The first embodiment of the invention employs a driven gear having a cam surface formed thereon where the gear is driven by the output shaft in a single direction of rotation at a substantially constant speed. A link member in the form of a second gear is positioned adjacent the driven gear and is provided with a cam follower that engages the cam surface of the driven gear. The gear teeth of the second gear mesh with gear teeth of a third gear formed on the signal light assembly. Rotation of the driven gear in the single direction of rotation by the output shaft causes the cam follower of the second gear to follow along the driven gear cam surface and thereby causes the second gear to oscillate about its center axis through an arc segment. The oscillations of the second gear in turn cause the signal light assembly to cycle through arc segment oscillations at substantially constant angular velocity. By substituting the gear formed on the signal light assembly for different gears having different numbers of gear teeth and different diameters, the arc segment through which the light assembly is oscillated may be adjusted.

The second embodiment of the oscillating signal light mechanism of the invention employs the same driven gear having a cam surface as the first embodiment. The second embodiment replaces the second gear of the first embodiment with a link member in the form of a connecting rod. The connecting rod pivots about a fixed axis and has a cam follower mounted thereon that engages with the cam surface of the driven gear. Two or more pulleys are mounted for rotation on the base with at least one of the pulleys being mounted on a light assembly which is mounted for rotation on the base. A belt is looped around the pulleys and is positively engaged to each pulley mounted on a light assembly to avoid relative slip between the belt and pulley, and an opposite end of the connecting rod from its pivot point is connected to the belt. On rotation of the output shaft, the driven gear is again driven at a constant velocity in a single direction of rotation. The rotation of the driven gear and the engagement of the connecting rod cam follower with the driven gear cam surface causes the connecting rod to cycle through arc segment oscillations about its pivot point. The connection of the second end of the connecting rod to the belt transmits the arc segment oscillations of the rod to the pulleys causing the pulleys to oscillate through arc segments and thereby causing the signal light to cycle through arc segment oscillations at substantially constant angular velocity. By substituting pulleys of different diameters the arc segment through which the light assembly is oscillated may be adjusted.

The third embodiment of the oscillating signal light mechanism of the invention employs the same driven gear with a cam surface as the second embodiment. The third embodiment replaces the pivoting connecting rod of the second embodiment with a link member in the form of a linearly reciprocating slide bar. The slide bar is supported for reciprocating sliding movement over the gear and cam surface by a pair of guide bushings spaced on opposite sides of the gear. The opposite ends of the slide bar are connected to the pulley of the second embodiment. A cam follower depends downward from the slide bar and engages in the cam surface of the driven gear. The remaining structure of the third embodiment of the invention is substantially identical to that of the second embodiment. On rotation of the output shaft, the driven gear is rotated at a constant velocity in a single direction of rotation. The rotation of the driven gear and the engagement of the cam follower of the slide bar in the cam surface causes the slide bar to reciprocate linearly through the guide bushings. The connection of the slide bar to the belt transmits the reciprocating movement of the bar to the pulleys, causing the pulleys to oscillate through arc segments and thereby causing the signal light to cycle through arc segment oscillations at substantially constant angular velocity. By substituting pulleys of different diameters, the arc segment through which the light assembly is oscillated may be adjusted.

The fourth embodiment of the oscillating signal light mechanism of the present invention employs a first driven gear and a second gear as in the first embodiment of the invention, however the first and second gears mesh with each other for rotation about their respective axes in opposite directions of rotation at substantially the same velocity. The first and second gears have arcuate sections of gear teeth formed thereon that extend along only fractions of the circumferences of each of the gears. The signal light assembly of this embodiment, like the first embodiment, also has a third gear formed thereon and the arc segments of gear teeth of the first and second gears alternately engage with the gear teeth of the light assembly gear, thereby converting the constant velocity rotation in a single direction of the output shaft, to cycling movements of the signal light assembly through arc segment oscillations at substantially constant angular velocity. In the fourth embodiment of the invention the size of the arc segment swept by the signal light assembly can be adjusted by employing the third gear as an idler gear and providing a fourth gear on the light assembly in mesh with the third gear. Changing the size and number of teeth of the fourth gear will adjust the arc segment of oscillation of the light assembly.

The fifth embodiment of the invention, like the first embodiment, employs a driven gear having a cam surface formed thereon. However, the gear is selectively driven by the output shaft in opposite directions of rotation. A link member in the form of a second gear is positioned adjacent the driven gear and is provided with a cam follower that engages the cam surface of the driven gear. The centers of rotation of the driven gear and second gear are positioned relative to each other so that, when the cam follower of the second gear engages against a point on the cam surface of the driven gear that is closest to the driven gear axis of rotation, the axes of rotation of the driven and second gears and the center axis of the cam follower are all positioned in a single line. With this relationship, when the driven gear is rotated in opposite directions of rotation, its cam surface will cause the cam follower of the second gear to oscillate through two different arc segments. This in turn causes the second gear to oscillate through two different arc segments.

The gear teeth of the second gear mesh with gear teeth of a third gear formed on the signal light assembly. Rotation of the driven gear in opposite directions of rotation by the output shaft causes the second gear to oscillate about its center axis through the two different arc segments. The oscillations of the second gear in the two different arc segments in turn cause the signal light assembly to oscillate through two different arc segment oscillations. By adjusting the sizes of the driven and second gear and/or employing idler gears, the light assembly can be controlled to oscillate through a first arc segment facing in a first direction on output shaft rotation in one direction, and through a second arc segment facing in an opposite direction on output shaft rotation in an opposite direction.

A unique circuit may be employed in this embodiment of the invention in controlling the output shaft of the motor to rotate at different speeds when rotated in opposite directions, thereby enabling two different flash rates of the signal light assembly depending on which arc segments the signal light is oscillated through.

BRIEF DESCRIPTION OF THE DRAWINGS

Further objects and features of the present invention are revealed in the following detailed description of the preferred embodiments of the invention and in the drawing figures wherein:

FIG. 4 is a plan view, in section, of the first embodiment of the mechanism taken along the line 4—4 of FIG. 2;

FIG. 5 is an elevation view, in section, of the first embodiment of the mechanism taken along the line 5—5 of FIG. 4;

FIG. 6 is an elevation view, in section, of the first embodiment of the mechanism taken along the line 6—6 of FIG. 4;

FIG. 7 is a schematic of the cam configuration, and the circumferential subdivisions and the arc segment subdivisions through which the respective first and second gears of the first embodiment of the mechanism travel in operation of the mechanism;

FIG. 8 is a plan view of the second embodiment of the oscillating mechanism of the invention;

FIG. 9 is an elevation view of the second embodiment of the mechanism;

FIG. 14 is an elevation view, in section, of the fourth embodiment of the mechanism taken along the line 14—14 of FIG. 13;

DESCRIPTION OF THE PREFERRED EMBODIMENTS

Figure 1:
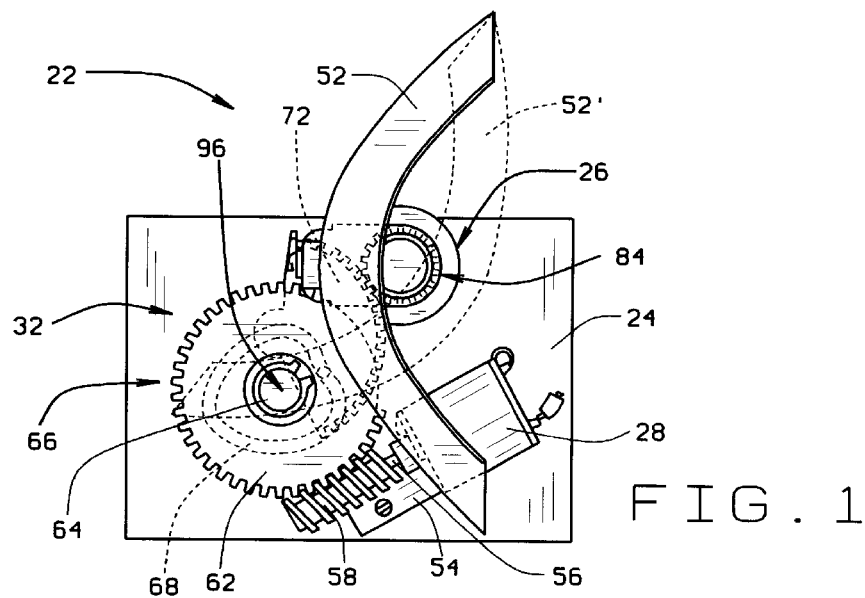
FIG. 1 is a plan view of the first embodiment of the oscillating signal light mechanism of the present invention.
Figure 2:
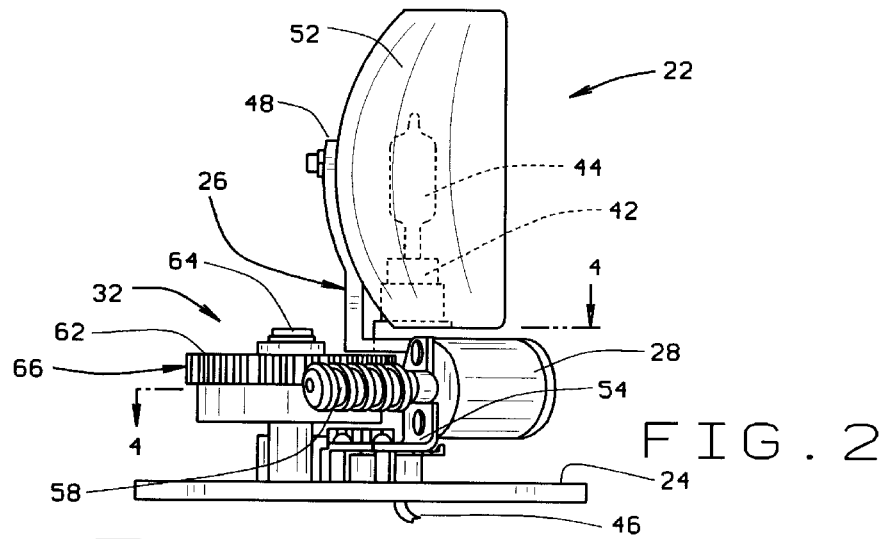
FIG. 2 is a front elevation view of the first embodiment of the mechanism.
Figure 3:
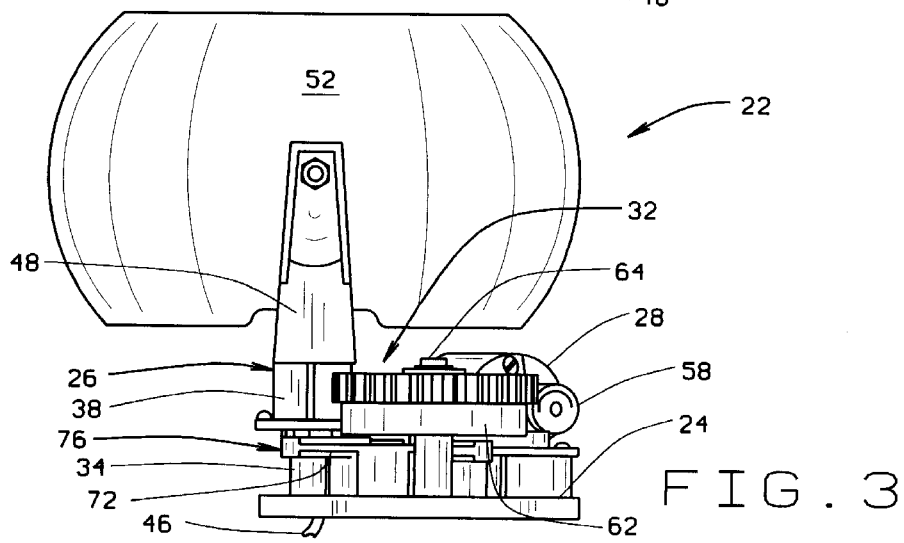
FIG. 3 is a side elevation view of the first embodiment of the mechanism.

FIGS. 1–6 show the first embodiment of the oscillating signal light mechanism 22 of the invention. The first embodiment is generally comprised of a base 24, a light assembly 26, a source of motive power, in this case an electric motor 28, and the inventive mechanical assembly 32 of the embodiment operatively connecting the motor 28 to the light assembly 26.

The base 24 is primarily illustrative in this and the following embodiments and may be a base of a signal light enclosure or an existing surface of a vehicle on which the mechanism 32 is employed.

The light assembly 26 is, for the most part, conventional and therefore is not described here in great detail. The assembly includes a lower housing portion 34 mounted to the base 24 by a hollow pivot pin or post 36. The post 36 attaches the light assembly housing to the base for oscillating or rotating movements of the light assembly relative to the base. An upper housing portion 38 is attached to and extends from the lower housing portion 34 and includes a conventional light socket 42 with a light bulb 44 received in the socket. Electrical wiring 46 for the socket 42 extends through the housing portions and the hollow interior of the pivot post 36 to below the base 24 where it is connected to a conventional power source (not shown). A support arm 48 extends upward from the upper housing portion 38 and supports a reflector 52 adjacent the light bulb 44.

The motor 28 is a conventional electric motor connected to a separate power source (not shown). The motor is supported on the base 24 by a support bracket 54. An output shaft 56 of the motor has a worm gear 58 secured thereon. In operation, the worm gear 58 is rotated in a single direction at a substantially constant velocity by the motor. In alternate embodiments, the worm gear 58 may be powered by a motor source completely separate from the base 24.

The mechanical assembly 32 of the invention includes a first driven gear 62 mounted for rotation on the base 24 by a first shaft 64 extending through the center of the gear. The first driven gear 62 has a plurality of gear teeth 66 formed around its circumference and also has a cam surface provided on the gear in the form of a cam slot 68 in the gear's bottom surface. As is best seen in FIG. 4, the cam slot 68 has a unique configuration which is generated in a manner yet to be described.

The mechanical assembly 32 also includes a link member in the form of a second gear 72 mounted for rotation on the base 24 by a second shaft 74 extending through the second gear. As shown in the drawing figures, the second gear 72 is only a section of a full gear and comprises only an arc segment of gear teeth 76. This enables the mechanism 32 to be constructed more compactly. However, the second gear 72 may be a full gear with the second shaft 74 extending through the center of the gear and the gear teeth 76 extending entirely around the circular circumference of the gear without affecting the operation of the mechanical assembly 32. The second gear 72 is provided with a cam follower 78 projecting upward from the top surface of the gear and engaging in the cam slot 68 of the first gear.

The mechanical assembly 32 also includes a third gear 82 secured to the lower housing portion 34 of the light assembly 26 for rotation therewith about the light assembly pivot post 36. The third gear 82 has a plurality of gear teeth 84 extending around its circumference and the gear teeth 76 of the second gear 72 engage with the third gear teeth 84. In this manner, the second gear 72 serves as the link member between the first driven gear 62 and the third gear 82 of the light assembly.

In operation, as the motor output shaft 56 rotates at a constant speed in a single direction, the worm gear 58 rotates the first driven gear 62 about the center axis of its shaft 64 in a single direction and at a reduced constant speed. Rotation of the first gear 62 about its shaft 64 also imparts rotation to the cam slot 68 about the shaft. The rotation of the cam slot 68 about the center axis of the shaft 64 causes the cam follower 78 of the second gear 72 to move through an arc segment having a constant radius corresponding to the distance of the center of the cam follower 78 from the center axis of the second gear shaft 74. As the cam follower 78 moves through the arc segment, it causes the second gear 72 to oscillate about the center axis of the second shaft 74 through the same arc segment. The meshing engagement of the gear teeth 76 of the second gear with the gear teeth 84 of the third gear converts the oscillating movement of the second gear 72 to oscillating movement of the third gear 82. The third gear and the attached light assembly 26 oscillate through an arc segment about the center axis of the light assembly pivot post 36 at a substantially constant velocity. In this manner, the constant speed rotation in one direction of the motor output shaft 56 is converted to cycling movements of the signal light assembly 26 through arc segment oscillations at a substantially constant speed. It should be appreciated that by changing the diameter of the third gear 82, the number of gear teeth 84 around the circumference of the gear will also change. By substituting the third gear 82 on the light assembly with a replacement gear having a different diameter and a different number of gear teeth around its circumference, and by remounting the light assembly to the base 24 by inserting the light assembly pivot post 36 in an adjustment hole 86 provided through the base at the proper spaced position from the gear teeth 76 of the second gear 72, the arc segment oscillations of the light assembly are adjusted and the speed of the oscillations is also adjusted. In this manner, the arc segment through which the light assembly is oscillated can be adjusted from a fraction of a complete rotation to one or more complete rotations.

FIG. 7 schematically shows a preferred configuration of the first driven gear cam slot 68. The slot configuration 92 shown converts the constant velocity, single direction rotation of the motor output shaft 56 to cycling movements of the signal light assembly 26 through arc segment oscillations at substantially constant angular velocity. In FIG. 7, the cam slot configuration 92 is divided into a plurality of circumferential subdivisions by a plurality of lines 94 radiating from the center axis 96 of the first driven gear. Adjacent radial lines 94 are separated by equal angles 98 and the portions of the cam slot configuration 92 between adjacent radial lines 94 represent the portions of the first driven gear cam slot 68 through which the cam follower 78 travels as the driven gear 62 rotates through an angle 98 about the center axis of the gear shaft 64. The arc segment 102 represents the complete arc segment through which the cam follower 78 oscillates as the second gear 72 oscillates about the center axis 104 of its shaft 74. The arc segment 102 is divided into equal arc subdivisions 106, the number of which equals the number of cam slot circumferential subdivisions 108 around one-half of the cam slot configuration 92.

Generally, as the driven gear 62 rotates at a constant speed in one direction, the rotation of the gear through each circumferential subdivision causes a corresponding movement of the cam follower 78 and second gear 72 through an arc subdivision 106. Beginning with the cam follower 78 positioned in the cam slot 68 in the position represented by the point 112 in FIG. 7, as the driven gear rotates clockwise 90° the cam slot 68 also rotates and the cam follower 78 moves through the slot to the point 114 shown in FIG. 7. At this position of the cam slot configuration 92, the cam follower 78 is moved through the same number of arc subdivisions 106 as the number of circumferential subdivisions 108 that the follower has passed through due to the configuration 92 of the cam slot. Therefore, with the driven gear 62 having rotated through one-quarter of a complete rotation, the cam follower 78 is oscillated half-way through the arc segment 102 to the point 116 shown in FIG. 7.

As the driven gear 62 continues to rotate an additional 90° so that the gear has now completed one-half of a complete rotation, the cam follower 78 is positioned at the point 118 relative to the cam slot configuration 92. Having rotated through half of the number of cam slot circumferential subdivisions 108, the cam follower has simultaneously moved through the total number of arc subdivisions 106 to the point 122 of the arc. With each of the arc subdivisions 106 being equal in size, as the first gear 62 rotates at a constant speed through one-half of a complete rotation, the cam follower is pushed by the cam slot configuration 92 through the complete configuration of the arc segment and has caused the second gear 72 to oscillate through one-half of a cycle of the arc segment oscillation at a constant speed.

As the first gear 62 continues to complete its rotation and rotates an additional 90°, the cam follower 78 travels through the cam slot 68 to the point 124 on the cam slot configuration 92. At this point 124 on the cam slot configuration 92, the cam follower 78 has been pulled back through the arc segment to the point 116 of the arc. As the first gear 62 completes one complete revolution, the cam follower is positioned again at the point 112 on the cam slot configuration where rotation of the first gear began. At this point 112, one complete cycle of the arc segment oscillation has taken place at a substantially constant speed. In the preferred embodiment, the ratio of gear teeth between the second gear 72 and the third gear 82 causes the light assembly to rotate from its initial position shown in solid lines in FIG. 1, through an arc of greater than 180° to a second position shown in dashed lines in FIG. 1, and then back to its initial position.

In some applications, to facilitate production of the driven or first gear 62, the cam slot configuration could be more simplified by forming it in a more circular configuration 128 as represented in dashed lines in FIG. 7. This circular configuration 128 is empirically formed to approximate the theoretical, constant speed cam configuration 92 and also produces a substantially constant speed oscillation of the light assembly through the arc segment. Alternatively, the slot configuration could be modified to any one configuration ranging between the optimum constant speed configuration 92 shown in FIG. 7 and the circular configuration 128 if so desired for a particular application.

Figures 8, 9, 14:
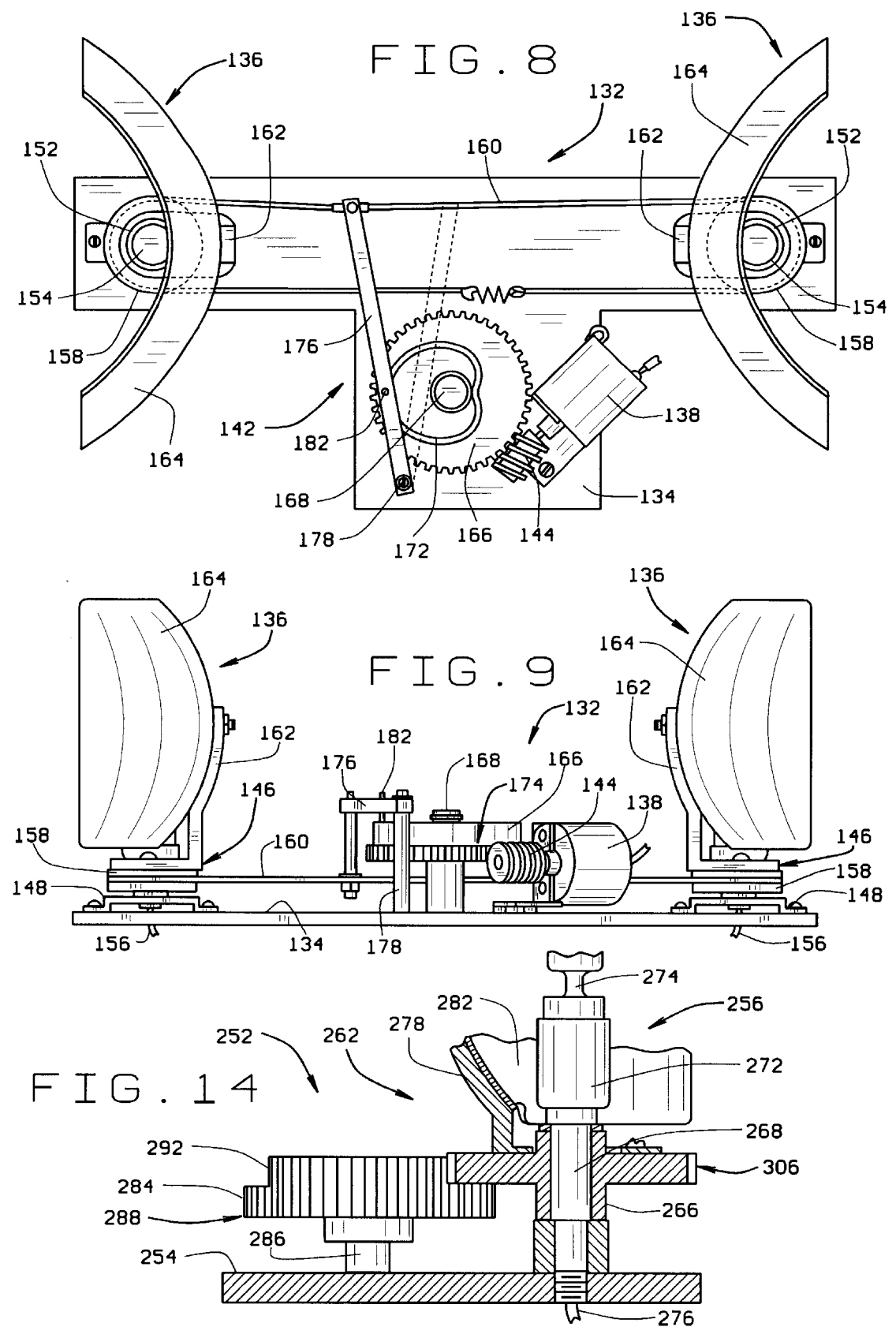

The second embodiment of the oscillating signal light mechanism 132 shown in FIGS. 8 and 9 is similar to the first embodiment in that it employs a driven gear having the same cam slot configuration of the first embodiment. The mechanism of the second embodiment is generally comprised of a base 134, a pair of light assemblies 136, an electric motor 138 and a mechanical assembly 142 converting the constant speed single direction rotation of the motor to cycles of arc segment oscillations of the light assemblies. The base 134 and electric motor 138 of the second embodiment are substantially identical to that of the first described embodiment with the electric motor including an output shaft and a worm gear 144 mounted on the shaft.

Each of the light assemblies 136 are conventional and are generally comprised of housing portions 146 mounted to the base 134 by support brackets 148 for rotating and oscillating movement of the light assemblies about their center axes relative to the base. The light assemblies include light sockets 152 and light bulbs 154 received in the sockets. The electrical wiring 156 providing power to the light sockets from separate power sources (not shown) extends from the bottom of the housings 146 through the base. Both light housings 146 are assembled with pulleys 158 mounted on the exteriors of the housings. A belt 160 is looped around each of the pulleys 158 a sufficient number of times to ensure that at least one point on the circumference of each of the pulleys will remain in engagement with the belt throughout the entire oscillation movements of the pulleys and light assemblies. At the one point on the circumference of each of the pulleys where the belt does not disengage from the pulleys as they oscillate, the belt is positively attached to the pulleys to prevent relative slip between the belt and pulleys during operation of the mechanism and to keep the oscillating movements of the light assemblies in synchronism. As shown in FIG. 8, the pulleys 158 have equal diameters and will oscillate their associated light assemblies about their center axes through substantially equal arc segments and at substantially the same speed on movement of the belt. Alternatively, the pulleys 158 are replaceable with substitute pulleys having different diameters so that the arc segment through which the pulleys and light assemblies oscillate may be adjusted together with the speed of oscillation. Moreover, the pulley on one light assembly may have a different size diameter than the pulley on the other light assembly causing the two assemblies to oscillate through different arc segments and at different speeds of oscillation. Still further, the embodiment of the invention shown in FIG. 8 may be modified with additional light assemblies other than the two shown so that the plurality of light assemblies will oscillate together. Of course, as the size and number of the pulleys are changed, the size of the belt looped around the pulleys must be correspondingly changed. Each of the light assemblies also includes a support arm 162 that extends upward from the assembly housing 146 and supports a reflector 164 adjacent the bulb 154 of the assembly.

As in the first embodiment, the second embodiment includes a first driven gear 166 mounted to the base 134 by a first shaft 168 for rotation of the gear relative to the base about the center axis of the shaft. The first gear has a cam surface provided by a cam slot 172 formed in the gear in the same manner as the driven gear of the first embodiment except that the slot is formed in the top surface of the gear. A plurality of gear teeth 174 surround the circumference of the first driven gear and mesh with the worm gear 144 of the motor. The configuration of the cam slot 172 is identical to that of the first embodiment. Moreover, the modifications to the cam slot described with reference to the first embodiment of the slot are also possible with the cam slot 172 of the second embodiment of the invention. Like the first embodiment of the cam slot, the preferred cam slot configuration of the second embodiment is also schematically represented in FIG. 7. The configuration of the slot 172 converts the constant velocity, single direction rotation of the motor worm gear 144 to cycling movements of the light assemblies 136 through arc segment oscillations at substantially constant angular velocity. Also like the first embodiment, in some applications, to facilitate production of the driven gear 166, the cam slot configuration could be more simplified by forming it in a more circular configuration such as that represented by the dashed line 128 in FIG. 7. The circular configuration is empirically formed to approximate the theoretical, constant speed cam configuration and also produces substantially constant speed oscillations of the light assemblies through their arc segments. Alternatively, the cam slot configuration could be modified to any one configuration ranging between the optimum constant speed configuration 92 shown in FIG. 7 and the circular configuration 128 if so desired for a particular application.

The second embodiment of the invention does not employ a second gear as the link member as in the first embodiment, but employs a connecting rod 176 as the link member between the first driven gear 166 and the belt 160. The connecting rod 176 is mounted to the base 134 at one end by a pivot shaft or post 178. The mounting of the first end of the connecting rod 176 to the base by the pivot post 178 enables the rod to oscillate through an arc segment about the pivot connection of the rod to the post. The opposite, second end of the rod is connected to the belt 160. A cam follower 182 is connected to the rod intermediate its opposite ends. The follower 182 extends below the rod and engages in the cam slot 172 of the first gear 166.

The operation of the second embodiment of the oscillating signal light mechanism 132 is substantially identical to that of the first embodiment in that it converts the constant speed single direction rotation of the motor output shaft to cycles of substantially constant velocity arc segment oscillations of the light assemblies 136. As the motor 138 drives the worm gear 144 at a constant speed in a single direction, the first driven gear 166 is driven at a reduced constant speed in a single direction of rotation about the center axis of the gear shaft 168. The cam slot 172 travels in the same direction of rotation as the first gear and at the same constant speed of rotation of the gear. The cam follower 182 engaging in the cam slot 172 causes the connecting rod 176 to oscillate through an arc segment about the pivot post 178 supporting the rod. In the same manner as that described above with reference to the first embodiment and FIG. 7, as the cam slot 172 completes one rotation about the gear shaft 168, the second end of the connecting rod 176 cycles through one complete arc segment oscillation. The movement of the rod second end through the arc segment oscillation imparts motion to the belt 160 that in turn rotates or oscillates the pair of pulleys 158 and their associate light assemblies 136 through arc segments, the size of which is determined by the diameter of the pulleys. Because the motion of the second end of the connecting rod 176 through each of the arc segment subdivisions is at a substantially constant speed as explained earlier with reference to the first embodiment, the arc segment oscillations imparted to the light assemblies 136 by the pulleys 158 and the belt 160 are also at substantially constant speeds.

Figure 10:
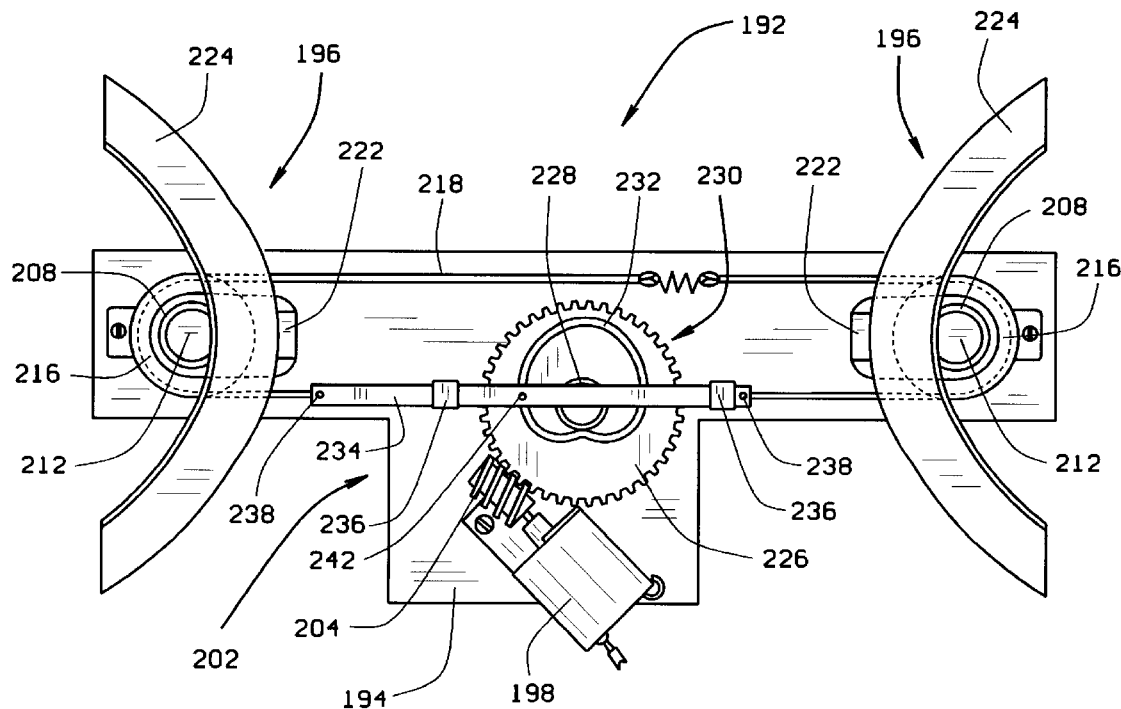
FIG. 10 is a plan view of the third embodiment of the oscillating mechanism of the invention.
Figure 11:
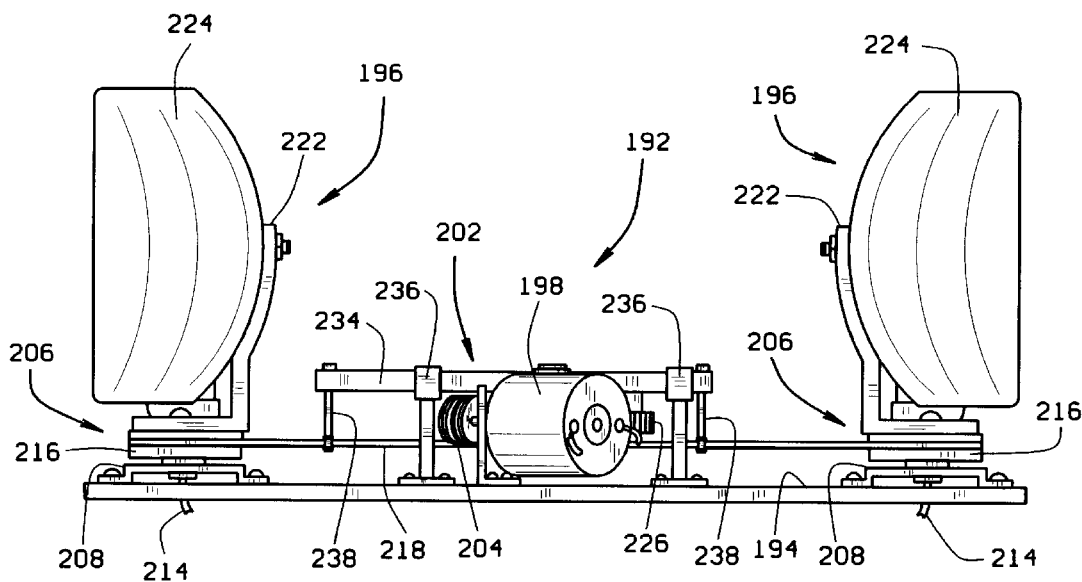
FIG. 11 is an elevation view of the third embodiment of the mechanism.

The third embodiment of the oscillating signal light mechanism 192 shown in FIGS. 10 and 11 is similar to the second described embodiment in that it employs a driven gear having the same cam slot configuration of the second embodiment to drive a pair of pulleys and their associated signal light assemblies just as in the second embodiment. The mechanism of the third embodiment is generally comprised of a base 194, a pair of light assemblies 196, an electric motor 198 and a mechanical assembly 202 converting the constant speed single direction rotation of the motor to cycles of arc segment oscillations of the light assemblies. The base 194 and electric motor 198 of the third embodiment are substantially identical to that of the second embodiment with the electric motor including an output shaft and a worm gear 204 mounted on the shaft, the only differences being the changed relative position of the motor on the base.

Each of the light assemblies 196 are conventional and are identical to the light assemblies of the second embodiment. Like the assemblies of the second embodiment, the assemblies 196 include housing portions 206 mounted to the base 194 by support brackets 208 for rotating and oscillating movement of the light assemblies about their center axes relative to the base. Light sockets 208 are supported on the housing portions 206 and light bulbs 212 are received in the sockets. The electrical wiring 214 providing power to the light sockets from separate power sources (not shown) extends from the bottom of the housings through the base. Both light housings 206 are assembled with pulleys 216 mounted on the exteriors of the housings. A belt 218 is looped around each of the pulleys 216 a sufficient number of times to ensure that at least one point on the circumference of each of the pulleys will remain in engagement with the belt throughout the entire oscillation movements of the pulleys and light assemblies. Like the second embodiment, at the one point on the circumference of each of the pulleys where the belt does not disengage from the pulleys as they oscillate, the belt is positively attached to the pulleys to prevent relative slip between the belt and pulleys during operation of the mechanism and to keep the oscillating movements of the light assemblies in synchronism. As shown in FIGS. 10 and 11, the pulleys 216 have equal diameters and will oscillate their associated light assemblies 196 about their center axes through substantially equal arc segments and at substantially the same speed on movement of the belt 218. Like the second embodiment, the pulleys 216 are replaceable with substitute pulleys having different diameters so that arc segments through which the pulleys and light assemblies oscillate may be adjusted together with the speed of oscillation. The pulleys on the two light assemblies may also have different size diameters to cause the two light assemblies to oscillate through different arc segments and at different speeds of oscillation. Moreover, the third embodiment of the invention may be modified with additional light assemblies other than the two shown so that pluralities of light assemblies will oscillate together. As the size and number of pulleys are changed, the size of the belt looped around the pulleys will also be correspondingly changed. Each of the light assemblies also includes a support arm 222 extending upward from the assembly housing 206 and supporting a reflector 224 adjacent the bulb 212 of the assembly.

As set forth above, the third embodiment includes a driven gear 226 mounted to the base 194 by a first shaft 228 for rotation of the gear relative to the base about the center axis of the shaft. A plurality of teeth 230 surround the driven gear and mesh with the worm gear 204. The first gear 226 has a cam surface provided by a cam slot 232 formed in the top of the gear with the cam slot having the same configuration of the second embodiment in that it is also schematically represented in FIG. 7. The configuration of the slot 232 converts the constant velocity, single direction rotation of the motor worm gear 204 to cycling movements of the light assemblies 196 through arc segment oscillations at substantially constant angular velocity in the same manner as the second embodiment as will be explained. In the same manner as the second embodiment of the invention, to facilitate production of the first gear 226 the cam slot configuration could be more simplified by forming it in a more circular configuration as represented by the dashed line 128 in FIG. 7. Alternatively, the cam slot configuration could be modified to any one configuration ranging between the optimum constant speed configuration 92 shown in FIG. 7 and the circular configuration 128 if so desired for a particular application.

The third embodiment does not employ a pivoting connecting rod as the link member as in the second embodiment, but employs a linearly reciprocating slide bar 234 as the link member between the first driven gear 226 and the belt 218. The slide bar 234 is mounted to the base 194 at its opposite ends by a pair of guide bushings 236. The slide bar 234 extends through the centers of the guide bushings 236 and the mounting of the bar in the bushings enables the bar to reciprocate linearly through the bushing centers. The opposite ends of the slide bar 234 are connected to opposite ends of the belt 218 by a pair of downwardly depending pins 238. A cam follower 242 is connected to the rod intermediate its opposite ends. The follower 242 extends below the rod and engages in the cam slot 232 of the first driven gear 226 in the same manner as the cam follower of the second embodiment.

The operation of the third embodiment of the oscillating signal light mechanism 192 is substantially identical to that of the second embodiment in that it converts the constant speed single direction rotation of the motor output shaft to cycles of substantially constant velocity arc segment oscillations of the light assemblies 196. As the motor 198 drives the worm gear 204 at a constant speed in a single direction, the first driven gear 226 is driven at a reduced constant speed in a single direction of rotation about the center axis of the gear shaft 228. The cam slot 232 travels in the same direction of rotation as the first gear and at the same constant speed of rotation of the gear. The cam follower 242 engaging in the cam slot 232 causes the slide bar 234 to reciprocate linearly through the centers of the guide bushings 236 supporting the bar. In the same manner as that described above with reference to the second embodiment and FIG. 7, as the cam slot 232 completes one rotation about the gear shaft 228, the slide bar 234 cycles through one complete linear reciprocation. The movement of the slide bar through one complete reciprocation imparts motion to the belt 218 that in turn rotates or oscillates the pair of pulleys 216 and their associated light assemblies 196 through arc segments, the size of which is determined by the diameter of the pulleys. Because the reciprocating motion of the slide bar through each complete linear cycle is at a substantially constant speed due to the configuration of the cam slot 232 as explained above with regard to the second embodiment, the arc segment oscillations imparted to the light assemblies 196 by their pulleys 216 and the belt 218 are also at substantially constant speeds.

Figure 12:
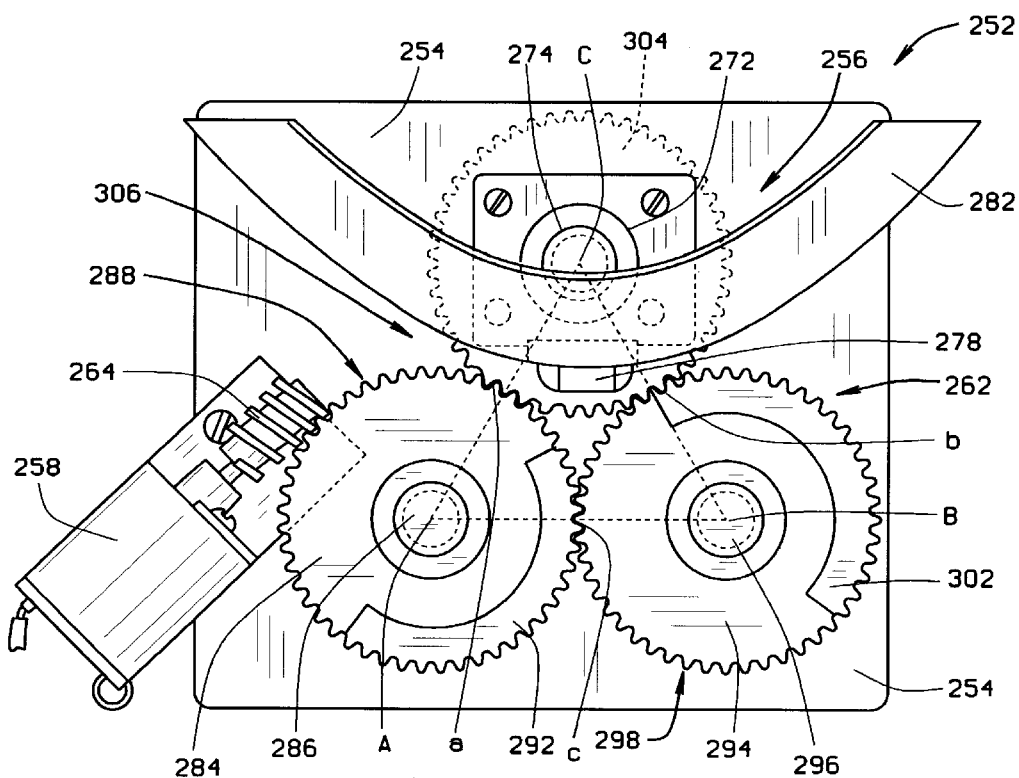
FIG. 12 is a plan view of the fourth embodiment of the oscillating mechanism of the invention.
Figure 13:
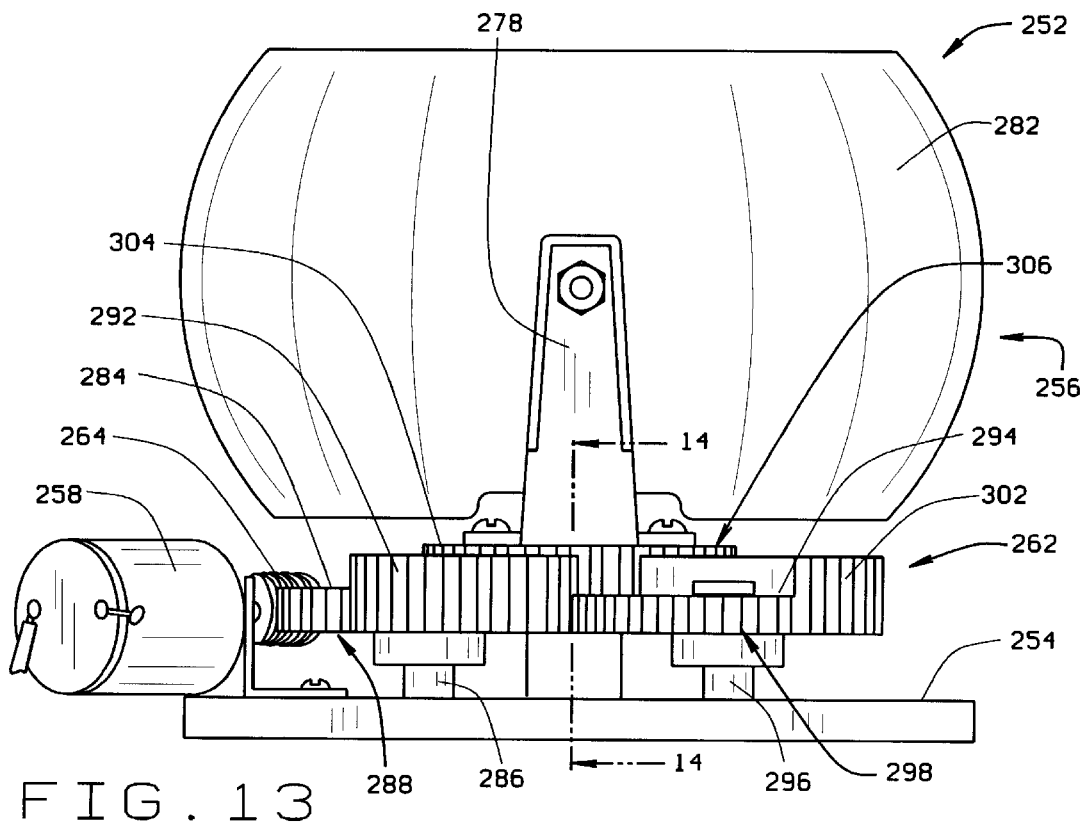
FIG. 13 is an elevation view of the fourth embodiment of the mechanism.

The fourth embodiment of the oscillating signal light mechanism 252 of the present invention is shown in drawing FIGS. 12–14. This embodiment is similar to the first described embodiment in that it employs three gears in converting the constant speed, single direction rotation of a motor output shaft into cycles of substantially constant arc segment oscillations of a light assembly.

The mechanism of the fourth embodiment is generally comprised of a base 254, a light assembly 256, an electric motor 258 and a mechanical assembly 262 converting the constant speed single direction rotation of the motor to cycles of arc segment oscillations of the light assembly. The base 254 and electric motor 258 are substantially identical to that of the first described embodiments with the electric motor including an output shaft and a worm gear 264 mounted on the shaft.

Again, the light assembly 256 employed with this embodiment of the invention is, for the most part, conventional. The assembly includes a housing portion 266 attached to the base by a hollow pivot pin or post 268. The post 268 attaches the light assembly housing to the base for oscillating or rotating movements of the light assembly relative to the base. A conventional light socket 272 is provided extending from an upper portion of the housing 266 and a light bulb 274 is received in the socket. Electrical wiring 276 for the socket extends through the housing and the hollow interior of the pivot post to below the base where it is connected to a conventional power source (not shown). A support arm 278 extends upward from the housing and supports a reflector 282 adjacent the light bulb 274.

As in the previously described embodiments, the fourth embodiment includes a first driven gear 284 mounted to the base 254 by a first shaft 286 for rotation of the gear relative to the base about the center axis of the shaft. The first gear has a plurality of gear teeth 288 that surround the circumference of the gear and mesh with the worm gear 264 of the motor. The first gear 284 is also provided with an arcuate section of gear teeth 292 that are extensions of the gear teeth 288 that surround the circumference of the first gear. As seen in the drawing figures, the arc section of gear teeth 292 is positioned on top of the first gear 284 above the gear teeth 288 that completely surround the circumference of the gear, and the arc section of gear teeth 292 extends less than half way around the circumference of the gear.

The mechanical assembly 262 also includes a second gear 294 mounted for rotation on the base 254 by a second shaft 296 extending through the center of the second gear. The second gear is also provided with a plurality of gear teeth 298 that extend completely around the circumference of the gear. The number of gear teeth in the plurality 298 equals the number of gear teeth 288 surrounding the circumference of the first gear. The second gear is also provided with an arcuate section of gear teeth 302 on the top surface of the gear. As with the first gear, the gear teeth of the second arcuate section 302 are extensions of the gear teeth 298 that completely surround the circumference of the second gear. However, the arcuate section of gear teeth 302 extends less than half way around the circumference of the second gear. As seen in the drawing figures, the plurality of gear teeth 288 extending around the circumference of the first gear are in constant mesh with the plurality of gear teeth 298 extending around the circumference of the second gear. However, the first arcuate section of gear teeth 292 is positioned on the first gear relative to the second arcuate section of gear teeth 302 positioned on the second gear so that the first and second arcuate sections of teeth never come into mesh with each other as the first and second gears rotate in mesh with each other.

A third gear 304 is secured to the housing 266 of the light assembly 256 for rotation therewith about the light assembly pivot post 268. The third gear 304 has a plurality of gear teeth 306 extending completely around its circumference. The number of gear teeth surrounding the third gear 304 is equal to the numbers of gear teeth surrounding the first 284 and second 294 gears. As seen in the drawing figures, the third gear 304 is positioned on the light assembly housing 266 where the teeth 306 of the third gear mesh with only the teeth of the first arcuate section 292 of the first gear and the second arcuate section 302 of the second gear. The teeth 306 of the third gear 304 do not mesh with the gear teeth 288 that extend completely around the circumference of the first gear 284 or the gear teeth 298 that extend completely around the circumference of the second gear 294. Due to the relative positions of the first and second arcuate sections of gear teeth 292, 302, it can be seen that the first and second arcuate sections of gear teeth mesh alternatively with the gear teeth 306 of the third gear. The numbers of gear teeth and the diameters of the first, second and third gears are specifically determined so that the gear teeth of one of the two arcuate sections of teeth 292, 302 will just be coming into engagement with the gear teeth 306 of the third gear as the gear teeth of the other of the two arcuate sections 292, 302 are just coming out of engagement with the gear teeth of the third gear.

In the arrangement of the three gears shown in FIG. 12, because each of the three gears 284, 294, 304 have equal numbers of gear teeth extending completely around their circumferences and because each of the three gears have equal diameters, the center axes A, B, C of the three respective gears 284, 294, 304 form the three vertices of an equilateral triangle shown in dashed lines in FIG. 12. The dashed lines extending from the center of one of the three gears to the centers of the other two gears are separated by an angle of 60°. In order to maintain the synchronous rotation of the three gears and to ensure that the arcuate gear teeth sections 292, 302 of the first and second gears alternately mesh with the gear teeth 306 of the third gear, the number of gear teeth in each gear arc segment that subtends the 60° angle between adjacent sides of the equilateral triangle must be an integer and one-half of gear teeth. For example, the numbers of gear teeth in the arc segments between points a and b, b and c, and c and a, must be an integer and one-half of gear teeth. In the operative environment shown in FIG. 12, the number of gear teeth in each gear segment subtending the interior angles of the equilateral triangle is 7½. Because the numbers of gear teeth of each of the three gears between the intersection points a, b, c of the three gears is one-sixth the total number of gear teeth, in the embodiment shown in FIG. 12 each of the three gears will have a total number of 45 teeth. In the embodiment of FIG. 12 each of the arcuate sections of gear teeth 292, 302 have 20 teeth and therefore each arcuate section does not extend around one-half of the circumference of the gear. The difference in the number of the gear teeth of each arcuate section 292, 302 and the number of gear teeth extending around one-half of the circumference of the first and second gears 284, 294 ensures that the gear teeth of one of the arcuate sections will be completely disengaged from the gear teeth 306 of the third gear 304 before the gear teeth of the other arcuate section come into engagement with the gear teeth 306 of the third gear.

In variations of the fourth embodiment of the gearing mechanism 262, should it be desirable to change the diameters and total numbers of teeth surrounding the first, second and third gears, the numbers of gear teeth in the gear sections subtending the interior angles of the equilateral triangle ABC must be an integer and one-half of gear teeth in order to ensure the synchronous rotation of the three gears and the alternating engagement of the two arcuate gear sections with the third gear. In each variation of the fourth embodiment of the mechanism, the total number of gear teeth surrounding the circumference of each gear will equal six times the number of gear teeth (an integer and one-half) in the section of each gear subtending an interior angle of the equilateral triangle. For example, if the number of gear teeth in the gear section subtending an interior angle of the equilateral triangle is 3½, the total number of gear teeth will be 21. If the number of gear teeth in the gear section subtending an angle is 9½, the total number of gear teeth will be 57.

In operation, as the motor output shaft rotates at a constant speed in a single direction, the worm gear 264 rotates the first driven gear 284 about the center axis of its shaft 286 in a single direction (shown counterclockwise in FIG. 12) and at a reduced constant speed. Rotation of the first gear 284 about its shaft also imparts rotation to the second gear 294 in an opposite direction of rotation about its shaft 296 (shown clockwise in FIG. 12) and at the same speed as the first gear. The gear teeth 288 surrounding the circumference of the first gear mesh with the gear teeth 298 surrounding the circumference of the second gear and the first and second gears rotate in opposite directions at the same speed.

At alternating time periods, the gear teeth of the first gear arcuate section 292 and the gear teeth of the second gear arcuate section 302 will come into meshing engagement with the gear teeth 306 of the third gear. Because the teeth 306 of the third gear are elevated relative to the gear teeth 288 extending around the circumference of the first gear and the gear teeth 298 extending around the circumference of the second gear, the gear teeth of the third gear do not come into mesh with these sets of gear teeth. As shown in FIG. 12, as the gear teeth of the first arcuate section 292 come into engagement with the gear teeth 306 of the third gear, the third gear is rotated in a clockwise direction together with the light assembly 256 about the pivot post 268. As the last gear tooth of the first arcuate section of gear teeth 292 is coming out of engagement with the gear teeth 306 of the third gear, the gear teeth of the second arcuate section 302 are coming into engagement with the gear teeth of the third gear. When the gear teeth of the second arcuate section 302 come into engagement with the gear teeth 306 of the third gear, the gear teeth of the first arcuate section 292 are completely disengaged from the gear teeth of the third gear. Engagement of the gear teeth of the second arcuate section 302 with the gear teeth 306 of the third gear stops the rotation of the third gear and the light assembly in the clockwise direction and immediately causes the third gear and light assembly to rotate counterclockwise as viewed in FIG. 12. Because the number of gear teeth of the first and second arcuate sections 292, 302 are the same, the alternating meshing engagement of the first and second arcuate sections of gear teeth with the gear teeth of the third gear cause the third gear and the light assembly to cycle through arc segment oscillations at a substantially constant speed.

In the fourth embodiment of the invention 252, the size of the arc segment swept by the signal light assembly 256 may be adjusted by employing the third gear 304 as an idler gear in its position shown in FIG. 12 but without the light assembly. The light assembly would then be mounted on the base 254 adjacent the third, idler gear 304 in the same manner as described above. A fourth gear is mounted on the light assembly in mesh with the third, idler gear. By using various different gears with different diameters and numbers of teeth as the fourth gear, the size of the light assembly arc segment sweep is adjusted.

Figure 15:
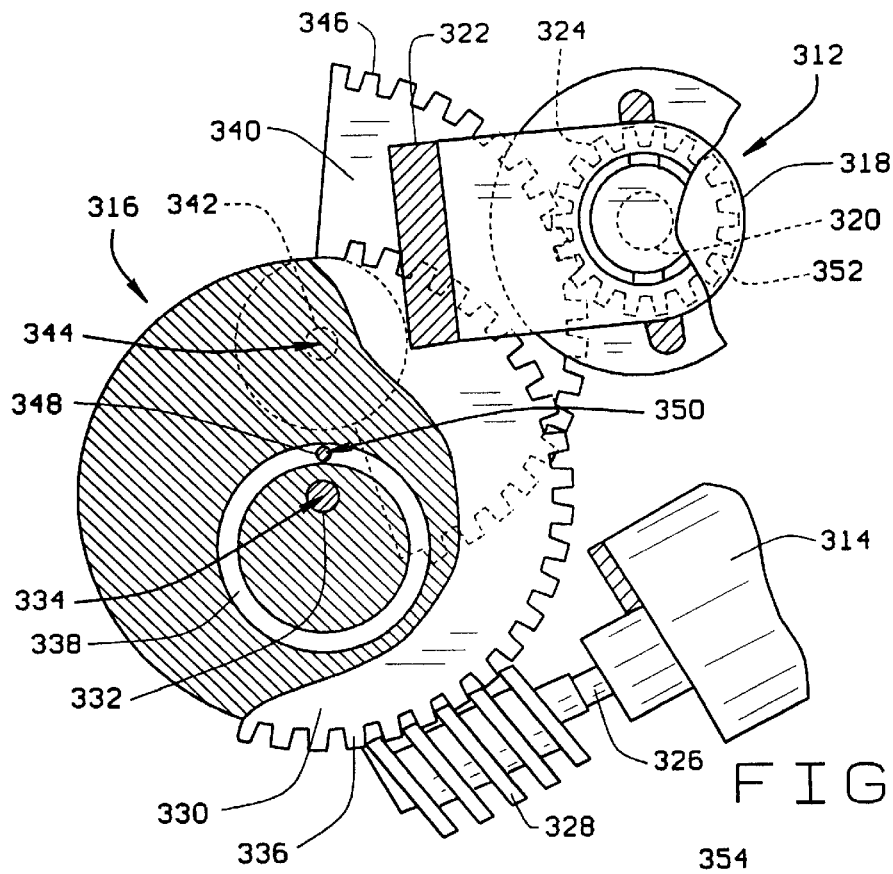
FIG. 15 is a plan view of the fifth embodiment of the oscillating signal light mechanism of the present invention.
Figure 17:
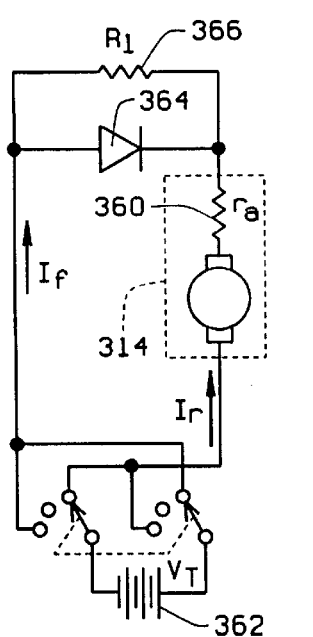
FIG. 17 is a schematic of a circuit employed with the signal light mechanism of FIG. 15.
Figure 16:
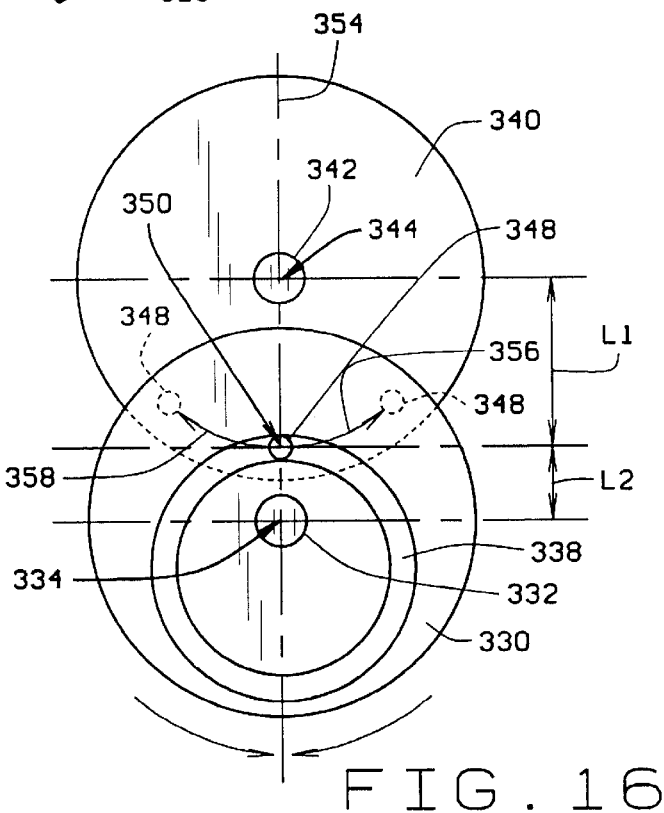
FIG. 16 is a schematic of the gear mechanism of FIG. 15.

FIGS. 15, 16 and 17 illustrate a fifth embodiment of the oscillating signal light mechanism of the invention. This embodiment is very similar to the first described embodiment of FIGS. 1–7. Like the first embodiment, it is generally comprised of a base (not shown), a light assembly 312, a source of motive power, in this case an electric motor 314, and the inventive mechanical assembly 316 of the embodiment operatively connected between the motor 314 and the light assembly 312.

The light assembly 312, like that of the first embodiment, is conventional and includes a housing 318 that is mounted for pivoting movement on a pivot pin or post 320. The post mounting permits the light assembly to oscillate or rotate about the post. A light socket containing a light bulb (not shown) extends above the housing 318. A support arm 322 extends upwardly from the housing 318 and supports a reflector (not shown). A gear 324 is securely attached to the housing 318 and rotates with the housing about the pivot post 320.

The motor 314 is a conventional electric motor powered by a circuit shown in FIG. 17 which is yet to be explained. An output shaft 326 of the motor has a worm gear 328 secured thereon. In operation, the worm gear 328 is controlled by the circuit of FIG. 17 to rotate, selectively, in opposite directions of rotation. Furthermore, in a variant of the embodiment of FIGS. 15–17, the speed of rotation of the worm gear can be controlled to rotate at different speeds depending on the direction of rotation.

The mechanical assembly 316 of this embodiment includes a first driven gear 330 as in the first embodiment. The driven gear 330 is mounted for rotation on a first shaft 332 having a center axis 334. The gear has a plurality of teeth 336 formed around its circumference and also has a cam surface in the form of a cam slot 338 formed in the gear's bottom surface. In comparing FIG. 15 to FIG. 4, it is seen that the configuration of the cam slot 338 of the fifth embodiment is different from that of FIG. 4. However, a cam slot having the configuration of that of FIG. 4 may be used in this embodiment. What is important is the relative positions of the gear axes, the cam slot and the cam follower as will be explained.

The mechanical assembly 316 also includes a link member in the form of a second gear 340 mounted for rotation on a second shaft 342 having a center axis 344. As in the first embodiment, the second gear 340 is shown as only a section of a full gear and comprises only a arc segment of gear teeth 346. This enables the mechanism to be constructed more compactly. However, the second gear may be a full gear without affecting the operation of the mechanical assembly. However, the relative sizes of the first gear, second gear and light assembly gear would have to be adjusted to accommodate a full second gear. The second gear 340 is also provided with a cam follower or pin 348 projecting upwardly from the top surface of the gear and engaging in the cam slot 338 of the first gear. The pin follower 348 has a center axis 350. The gear teeth 346 of the second gear mesh with gear teeth 352 of the light assembly gear 324, whereby the mechanical assembly 316 is operatively connected between the motor output worm gear 328 and the light assembly gear 324.

The relationship between the first driven gear cam slot 338, the cam follower pin 348 of the second gear, and the center axes of the first driven gear 334 and the second gear 344 is schematically shown in FIG. 16. The specific arrangement of these component parts of the mechanical assembly achieves the desired operative result of oscillating the light assembly 312 through two different arc segments directed in different directions in response to the motor output shaft 326 being alternately rotated in opposite directions. The distance between the cam follower center axis 350 and the second gear center axis 344 is shown as L1. L2 is the shortest distance between the first gear center axis 334 and the middle of the cam slot 338. All other points along the middle of the cam slot are spaced further away from the first gear axis 334. The distance L2 is also the closest the cam follower center axis 350 will come to the first gear center axis 334 during rotation of the first gear, regardless of its direction of rotation. FIG. 16 shows the relative positions of the first and second gears when the center axis 350 of the second gear cam follower 348 aligns with the center axes of the second gear 344 and the first gear 334. These three axes will occupy this aligned position once on every complete rotation of the first driven gear 330, regardless of its direction of rotation. The relative positions of the component parts of the mechanism shown schematically in FIG. 16 enables the mechanism to oscillate the second gear through two different arc segments, depending on the direction of rotation of the first gear, without causing the engagement between the cam follower 348 and the cam slot 38 to bind up.

It can be seen that if the distance between the first gear center axis 334 and the second gear center axis 344 is less than the distance L1 plus L2, then the cam follower pin 348 must be positioned to either the right or left side of the line 354 passing through the first gear center axis 334 and the second gear center axis 344. The cam follower 348 would remain on this side of the line 354 regardless of the direction of rotation of the first gear 330. If the distance between the gear center axes is greater than L1 plus L2, the cam follower 348 would then not be able to complete one full rotation through the cam slot 338 without jamming the mechanism as it approaches the position in the slot shown in FIG. 16. However, with the particular relationship shown in FIG. 16 where the spacing between the first gear center axis 334 and the second gear center axis 344 is exactly the distance L1 plus L2, the position of the pin 348 with respect to the connecting line 354 between the center axis of the two gears is not defined by the geometry of the mechanism but is determined by the direction of rotation of the first driven gear 330. The small amount of clearance provided between the cam slot 338 and the cam follower pin 348, and the friction exerted on the pin by the cam slot during rotation of the first driven gear 330 in opposite directions of rotation provides a reliable change in direction of travel of the cam follower pin 348 in the cam slot 338 over the center connecting line 354 on reversal of motor rotation.

Referring to FIG. 16, on clockwise rotation of the first driven gear 330 through rotation of the motor output shaft 326 in a first direction of rotation, the engagement of the cam follower pin 348 in the cam slot 338 will cause the second gear 340 to oscillate with the pin oscillating through a first arc segment 356 positioned to the right hand side of the connecting line 354. Counterclockwise rotation of the first driven gear 330 caused by rotation of the motor output shaft 326 in an opposite second direction produces oscillation of the cam follower pin 348 through a second arc segment 358, equal to the first arc segment but positioned on the left side of the connecting line 354. This oscillating movement of the cam follower 348 and the second gear 340 caused by reversing rotation of the motor output shaft 326 is transmitted through the second gear teeth 346 to the light assembly gear 324 and results in oscillating movement of a light assembly through two different arc segments on rotation of the motor output shaft in opposite directions. By varying the size of the gears of the mechanism and their numbers of teeth, or by adding one or more idler gears or belt and pulley drives between the mechanism and the light assembly, the size of the arc segment oscillations of the light assembly can be adjusted. For example, the mechanism could be used to oscillate the light assembly through a first arc segment facing in one direction on rotation of the output shaft in one direction, and then through a second arc segment facing 180° in the opposite direction on reversing motor rotation.

FIG. 17 shows a schematic of a circuit that may be used to control the rotation of the motor 314 in opposite directions of rotation, where the speed of motor rotation in a first direction is greater than the speed of motor rotation in the second opposite direction. As shown in FIG. 17, the motor 314, which includes an internal winding resistance 360, is connected in series with a d-c power source 362, and a diode 364 connected in parallel with a resister 366. As explained below, the parallel combination of the diode and the resister is provided for driving the motor at a greater speed in the first direction than in the opposite second direction.

When the d-c power source 12 is applied to the circuit with the polarity shown in FIG. 17, the diode 364 is forward biased and is equivalent to a short-circuit. Thus, the current induced through resistor 366 is negligible, and the forward current $I_f$ induced in the motor 314 is approximately equal to the voltage output $V_T$ of the d-c power source 362 divided by the internal winding resistance 360, or $V_T/r_a$.

To drive the motor 314 in the reverse direction, the polarity of the d-c power source is inverted using well-known switching techniques such that the reverse current $I_r$ induced through the motor 314 flows in a direction opposite to that of the forward current $I_f$. With the polarity of the d-c power source 362 inverted from the polarity shown in FIG. 17, the diode 364 will be reverse biased and equivalent to an open circuit, and substantially all of the reverse current $I_r$ will flow through the resistor 366. Thus, the reverse current $I_r$ induced in the motor 314 is approximately equal to the voltage output $V_T$ of the d-c power source 362 divided by the sum of the resistor 366 and the internal resistance 360, or $V_T/(R_1+r_a)$. In this manner, the circuit shown in FIG. 17 drives the motor 314 at a greater speed in the forward direction than in the reverse direction.

Although the operation of the circuit shown in FIG. 17 has been described for a d-c motor, the same effect can be achieved for an a-c motor by using an a-c power source in place of the d-c power source 362. If it is not desired to change the speed of the motor by changing its direction of rotation, the diode and resistor can be removed from the circuit.

While the invention has been described by reference to specific embodiments, it should be understood that modifications and variations of the invention may be constructed without departing from the scope of the invention defined in the following claims.

What is claimed is:

1. A signal light assembly comprising:

a signal light;

a source of motive power having an output shaft that is selectively controlled to rotate in opposite first and second directions of rotation; and, a mechanism connected between the output shaft and the signal light that moves the signal light in a first movement in response to rotation of the output shaft in the first direction, and moves the signal light in a second movement, different from the first movement, in response to rotation of the output shaft in the second direction, the first movement is an oscillating movement of at least two complete oscillations of the signal light through a first arc segment in response to complete rotation of the output shaft in the first direction and the second movement is an oscillating movement of at least two complete oscillations of the signal light through a second arc segment, different from the first arc segment, in response to complete rotation of the output shaft in the second direction.

2. The assembly of claim 1, wherein:

the first movement is at a first speed and the second movement is at a second speed, different from the first speed.

3. The assembly of claim 1, wherein:

the source of motive power is selectively controlled to rotate in the opposite first and second directions at different speeds.

4. The assembly of claim 3, wherein:

the source of motive power includes a motor driving the output shaft, the motor having first and second electric terminals, a power source and an electric circuit communicating the motor first and second terminals with the power source, the electric circuit is configured to induce a current in a first direction through the motor from the first terminal to the second terminal to drive the output shaft in the first direction at a first speed, and alternately to induce a current in a second direction through the motor from the second terminal to the first terminal to drive the output shaft in the second direction at a second speed.

5. The assembly of claim 4, wherein:

the electric circuit includes a diode and a resistor connected in parallel.

6. The assembly of claim 1, wherein:

the mechanism includes a cam that moves about a first axis and a cam follower that moves about a second axis, and the cam and is operatively connected to the output shaft and the cam follower is operatively connected to the signal light.

7. The assembly of claim 6, wherein:

the cam has a cam surface thereon and the cam follower has a pin that engages with the cam surface, the pin having a pin axis; and the first axis, the second axis, and the pin axis align during movement of the cam about the first axis.

8. The assembly of claim 6, wherein:

the cam has a cam surface thereon and the cam follower has a pin that engages the cam surface, the pin having a pin axis; and a shortest distance between the pin axis and the first axis as the pin engages with the cam surface summed with a distance between the pin axis and the second axis is equal to a distance between the first axis and the second axis.

9. A signal light assembly comprising:

a signal light;

a source of motive power having an output shaft that is selectively controlled to rotate in opposite first and second directions of rotation;

a mechanism connected between the output shaft and the signal light that moves the signal light in a first movement in response to rotation of the output shaft in the first direction, and moves the signal light in a second movement, different from the first movement, in response to rotation of the output shaft in the second direction; and, the mechanism includes a cam having a first axis and a cam surface, and a cam follower having a second axis and a pin engaging with the cam surface and having a pin axis, the cam is driven in opposite first and second directions about the first axis by rotation of the output shaft in the first and second directions, causing the follower to oscillate through different first and second arc segments about the second axis.

10. The assembly of claim 9, wherein:

the first axis, the second axis, and the pin axis all align when the cam is driven in the first direction.

11. The assembly of claim 10, wherein:

the first axis, the second axis, and the pin axis all align when the cam is driven in the second direction.

12. The assembly of claim 9, wherein:

the first axis, the second axis, and the pin axis all align when the follower is oscillated through the first arc segment.

13. The assembly of claim 12, wherein:

the first axis, the second axis, and the pin axis all align when the follower is oscillated through the second arc segment.

14. An oscillating signal light assembly comprising:

at least one signal light;

a motor having an output shaft that is rotatable in opposite first and second directions;

a manually operable control communicating with the motor for selectively controlling the direction of rotation of the output shaft; and, a mechanism connected between the light assembly and the output shaft that drives the light assembly in oscillations through a first arc segment in response to rotation of the output shaft in the first direction, and that drives the light assembly in oscillations through a second arc segment in response to rotation of the output shaft in the second direction.

15. The assembly of claim 14, wherein:

the manually operable control also controls a speed of rotation of the output shaft.

16. The assembly of claim 14, wherein:

the manually operable control includes a circuit communicating the motor with a source of power, the circuit is selectively controlled to induce a first current in a first direction through the motor to cause the motor output shaft to rotate in the first direction at a first speed, and alternately to induce a second current in a second direction through the motor to cause the motor output shaft to rotate in the second direction at a second speed, different from the first speed.

17. The assembly of claim 16, wherein:

the circuit comprises a diode and a resistor connected in parallel.

18. An oscillating signal light assembly comprising:

at least one signal light;

a motor having an output shaft that is rotatable in opposite first and second directions;

a manually operable control communicating with the motor for selectively controlling the direction of rotation of the output shaft; and, a mechanism connected between the light assembly and the output shaft that drives the light assembly in oscillations through a first arc segment in response to rotation of the output shaft in the first direction, and that drives the light assembly in oscillations through a second arc segment in response to rotation of the output shaft in the second direction; and the mechanism includes a cam having a first axis and a cam surface, and a cam follower having a second axis and a pin engaging with the cam surface and having a pin axis, the cam is rotated in opposite first and second directions about the first axis by rotation of the motor output shaft in its first and second directions of rotation, respectively; the cam follower is oscillated through different first and second arc segments by rotation of the cam in its first and second directions of rotation, respectively; and the light assembly is oscillated through its first and second arc segments by the oscillations of the cam follower through its first and second arc segments, respectively.

19. The assembly of claim 18, wherein:

the first axis, the second axis, and the pin axis all align during oscillations of the cam follower through its first arc segment.

20. The assembly of claim 19, wherein:

the first axis, the second axis, and the pin axis all align during oscillations of the cam follower through its second arc segment.

* * * * *